July 7, 1959     J. DURST     2,893,302
EXPOSURE METER ADJUSTING DEVICE
Filed Feb. 28, 1955
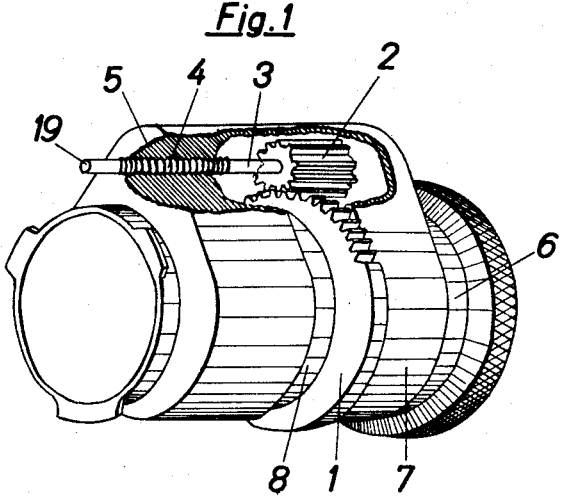
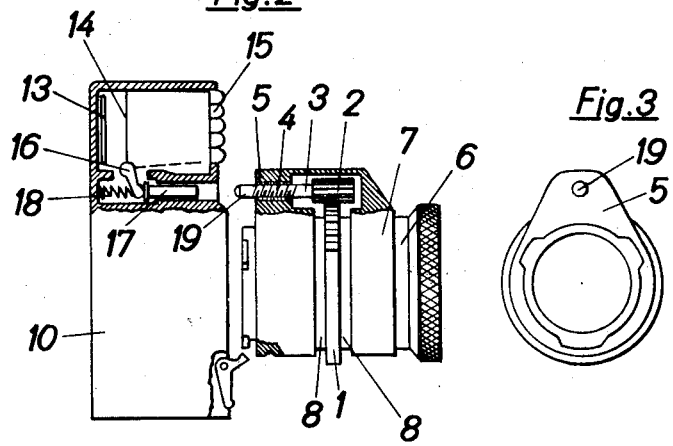
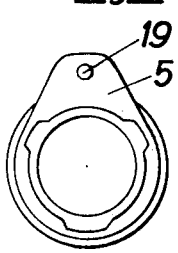
INVENTOR.
JULIUS DURST
BY
*Connolly & Hutz*
HIS ATTORNEYS United States Patent Office 2,893,302
Patented July 7, 1959

2,893,302

EXPOSURE METER ADJUSTING DEVICE

Julius Durst, Brixen, Italy, assignor to
AGFA Aktiengesellschaft

Application February 28, 1955, Serial No. 491,075

Claims priority, application Italy March 6, 1954

3 Claims. (Cl. 95—64)

This invention relates to a photographic device such as a camera, and particularly relates to a photographic device which is provided with an adjustable lens, the diaphragm of which is connected to an exposure meter.

Broadly, the invention is concerned with a mechanical linkage between the lens diaphragm and the exposure meter of a photographic device such as a camera whereby the actuation of the diaphragm adjusting means simultaneously actuates an adjustable light regulator for the exposure meter.

There have, heretofore, been various attempts to provide a simultaneous actuation of the lens diaphragm and the light aperture of the exposure meter. These prior devices, however, were not capable of providing the fine adjustment of the exposure meter which is necessary in this case. Furthermore, all such prior devices consisted of relatively complex mechanisms which were expensive to manufacture, which were easily subject to breakdown and which were expensive to repair. These complex mechanisms, also, made more difficult the fine adjustment which is so necessary in this type of device.

In contradistinction to the prior devices, the present invention provides a simple mechanical linkage for the conversion of the rotatable movement of the lens diaphragm ring to a straight line movement parallel to the optical axis of the lens.

It is, therefore, one object of the present invention to provide a photographic apparatus wherein the control means of an exposure meter is automatically adjusted in direct proportion to the lens opening of an adjustable photographic lens.

Another object of the present invention is to provide a device for coupling an exposure meter of a photographic apparatus to the diaphragm of an adjustable photographic lens wherein the rotatable movement of the diaphragm is converted to a straight line movement parallel to the optical axis of the lens.

Another object of the present invention is to provide a device for coupling an exposure meter of a photographic apparatus to the diaphragm of an adjustable lens wherein the connection between the exposure meter and the diaphragm consist of relatively few parts which are not subject to easy breakdown.

Other objects and many of the attendant advantages of this invention will be readily appreciated as the same becomes better understood by reference to the following detailed description when considered in connection with the accompanying drawings wherein:

Fig. 1 is a perspective view of a lens attachment embodying the present invention;

Fig. 2 is a side view partly in elevation and partly in section of a photographic device, including an exposure meter, in combination with the lens attachment of Fig. 1; the photographic device and the lens attachment being shown as disconnected from each other; and Fig. 3 is an end view of the lens attachment of Fig. 1.

Referring now in greater detail to the figures of the drawings wherein similar reference characters refer to similar parts there is shown a lens attachment which comprises a lens barrel provided with a diaphragm, not shown, which diaphragm is adapted to be rotatably actuated by an externally positioned diaphragm ring 1. The connection between the diaphragm ring and the diaphragm is well known in the art and since such specific structure, per se, forms no part of the present invention it has not been specifically shown. The diaphragm ring 1 is provided at one portion of the periphery thereof with teeth which are adapted to mesh with an elongated gear 2, from one end of which extends a shaft 3 which is provided with a threaded portion 4. The threaded portion 4 of the shaft 3 is threadedly engaged with an internally threaded opening 5 provided in a housing 7. The housing 7 is provided with a pair of dependent, axially spaced sleeve members in which the lens barrel 6 is rotatably mounted.

The lens barrel 6 is provided with a knurled knob at one end thereof and extends through both sleeves of the housing 7. The diaphragm actuating ring 1 is positioned on the portion 8 of the lens barrel in the space between the sleeve portions of the housing 7. Means are provided at the end of the attachment remote from the knurled knob for suitably securing this attachment to an opening in front of camera 10.

The camera 10 is provided with an exposure meter which includes a photo cell 13 in line with a lenticular lens 15. A pivoted partition 14 is provided in the space between the photo cell 13 and the lens 15 for the purpose of varying the amount of light permitted to impinge against the photo cell. The swinging of the partition 14 on its axis acts to vary the admission of light in relation to the pivotal position of the partition, as is clear from a view of Fig. 2 wherein the partition 14 is shown in full line in complete light-blocking position, and in dotted outline in full light opening position.

The partition 14 is pivotally actuated by a lever 16 which is connected at one end to the partition 14 and the other end of which is adapted to contact one end of a pin 17 which is axially movable within an opening in the exposure-meter housing. A spring 18 acts to bias the lower end of the lever 16 against the pin 17. The opposite end of the pin 17 is in alignment with the end 19 of the threaded shaft 3 so that the pin 17 is resiliently urged against the end 19 of the shaft.

The operation of the above described apparatus is as follows:

The lens attachment is connected to the camera 10 and locked in position by means of suitable means which do not require rotation of the attachment relative to the camera 10, for example, such means as disclosed in U.S. Letters Patent 2,032,866, because such rotation would prevent proper engagement of end 19 of threaded shaft 3 with the opening in which pin 17 is mounted. In this position the end 19 of the threaded shaft 3 extends into the opening in the exposure-meter housing in which the pin 17 is seated. Since the pin 17 is urged outwardly of the opening by the spring 18 it resiliently engages the end 19 of the shaft 3.

When the diaphragm of the lens attachment is actuated by rotating the ring 1, the teeth on the ring which are in mesh with gear 2 act to rotate the shaft 3 which, since it is in threaded engagement with its housing, acts to move the shaft axially. This axial movement of the shaft is permitted by the elongated construction of the gear 2 which permits it to slide axially relative to the ring 1 while yet maintaining its meshing engagement therewith.

The axial movement of shaft 3, against the force of the spring 18 acting on pin 17, causes the lever 16 to pivot, thereby moving the partition 14 downwardly. The amount of downward movement of the partition 14 depends on the amount of axial movement of the shaft 3 and this, in turn, depends on the amount of rotation of the ring 1 which actuates the lens diaphragm. It is, therefore, clear that the amount of light which is permitted to impinge against the photo cell 13 is in direct proportion to the lens opening.

Although the above described apparatus has been illustrated as using a pivoted plate, such as shown at 14, the device can equally as well be used to actuate other means for accomplishing a similar purpose, as, for example, a vertically or horizontally movable plate, a diaphragm or even an electrical device. However, the apparatus shown is preferred among other reasons, because of its greater accuracy and its inexpensive and simple construction.

It is also within the scope of the invention to use the above described device in conjunction with other photographic parts instead of the lens diaphragm illustrated. For example, the gear 2 may be operated by the movement of the camera shutter instead of the lens diaphragm. The invention is also adapted for various other purposes.

Obviously many modifications and variations of the present invention are possible in the light of the above teachings. It is, therefore, to be understood that within the scope of the appended claims the invention may be practiced otherwise than as specifically described.

What is claimed in this invention is:

1. The combination of an interchangeable lens attachment with a photographic camera comprising a lens barrel, said camera including a housing, latch and recess means for mounting said lens barrel upon said housing, a diaphragm actuating ring operatively associated with said lens barrel, a gear segment disposed about the outer periphery of a rotatable portion of said lens barrel, a pinion gear means disposed in operative engagement with said gear segment and including a threaded shaft, said shaft being threaded within a stationary portion of said lens barrel and including an end protruding outwardly from the portion of said lens barrel disposed adjacent the front of said housing and extending in a direction parallel to the longitudinal axis of said lens barrel, a light sensitive means disposed within said camera housing, a control means for varying the output of said light sensitive means in accordance with the amount of opening of said diaphragm, said control means being disposed within said camera housing adjacent the position of the end of said shaft when said lens barrel is mounted upon said housing, said control means including a lever, said housing including an aperture disposed in line with one end of said lever, a pin disposed in said aperture with one of its ends in contact with said lever and the other of its ends in position to be contacted by said end of said shaft when said lens barrel is mounted upon said housing, resilient means reacting between said housing and said lever in a direction to maintain said lever urged into contact with said pin, and said pin including a head disposed within said housing which bears against a portion of said housing surrounding said aperture to retain said pin within said housing when said lens barrel and shaft are removed.

2. The combination as set forth in claim 1 wherein said light sensitive device is an exposure meter including a rotatable partition, and said lever is directly connected to said partition.

3. The combination as set forth in claim 1 wherein said rotatable portion of said lens barrel is disposed between stationary portions of said barrel connected by a bridge structure, said pinion gear being disposed within a cutout in said bridge structure, and said shaft being threaded into the end of said bridge structure adjacent said aperture in said housing.

References Cited in the file of this patent

UNITED STATES PATENTS

| | | |
|---|---|---|
| 1,819,844 | Ross | Aug. 18, 1931 |
| 2,186,616 | Mihalyi | Jan. 9, 1940 |
| 2,194,031 | Riszdorfer | Mar. 19, 1940 |
| 2,379,698 | Fischer | July 3, 1945 |
| 2,576,813 | Simons | Nov. 27, 1951 |